Nov. 12, 1940.   W. CHLADEK   2,221,574
MACHINING TOOL
Filed Nov. 16, 1938

WITNESSES:
Edward Michaels
William J. Ruano

INVENTOR
Wilhelm Chladek.
BY
Paul E. Friedemann
ATTORNEY

Patented Nov. 12, 1940

2,221,574

UNITED STATES PATENT OFFICE 2,221,574

MACHINING TOOL

Wilhelm Chladek, Berlin-Pankow, Germany, assignor to Westinghouse Electric & Manufacturing Company, East Pittsburgh, Pa., a corporation of Pennsylvania Application November 16, 1938, Serial No. 240,722
In Germany December 10, 1937

6 Claims. (Cl. 90—21)

My invention relates to machines for producing relative motion between machining tools and objects to be machined, for example, milling machines and boring machines.

There is a tendency to use for the feeding motion of modern machining tools adjustable speed direct current motors to which power is supplied from a source of variable voltage as a Ward-Leonard type of control for a generator of a motor generator set. If, however, this driving motor and the motor-generator set would have to be dimensioned for producing the high feeding speeds required when the work is being mounted on a bed or platen, the cost involved would be prohibitive.

My invention proposed, therefore, to produce the normal feeding motions required in the course of the machining process proper by means of the motor which is energized from the variable voltage control, and to produce the rapid feeding motions required when the work is being set up by means of the more powerful driving motor of the motor-generator set. This motor of the motor-generator set is more powerful than the motor which is energized by the controlled generator, because it must overcome losses in the whole system.

Usually the driving motor of the motor-generator set will have sufficient power when a "take off" is employed in accordance with my invention. Even if it is necessary to increase the power of such driving motor in order to take care of the increased power necessary for effecting rapid movement of the bed or platen or other similar movable part of the machine, my invention will still have outstanding advantages, inasmuch as the driving motor of the motor-generator set would be the only machine of the set which would require a high rating. The remaining machines of the set, namely, the generator driven by said motor and the motor which is excited by said generator and the exciting motor of said generator will not require higher ratings.

A broad object of my invention is to selectively secure, as desired, either a smaller or larger power from a motor-generator system for slow or rapid movement, respectively, of the object to be machined or of the machining tool.

A more specific object of my invention is to selectively secure, as desired, either a smaller or larger power from a motor generator set for slow or rapid movement, respectively, of a platen in a milling machine.

Another specific object of my invention is to selectively secure a smaller or larger power from a motor generator system for slow or rapid movement, respectively, of the movable support for a boring spindle in a boring machine.

Other objects and advantages will become more apparent from a study of the following specification when considered in conjunction with the accompanying drawing, in which.

Figure 1:
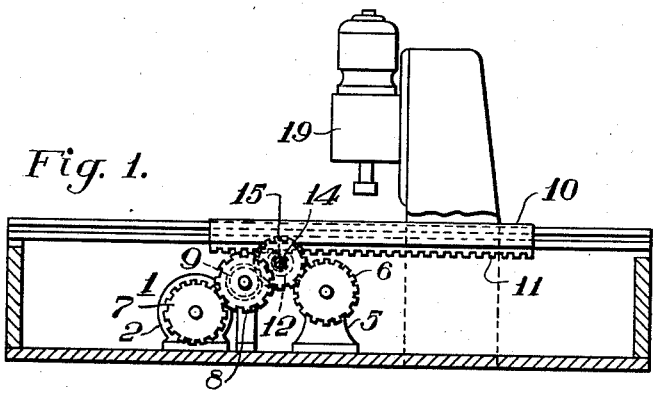
Figure 1 is a side view of a milling machine embodying my invention.
Figure 2:
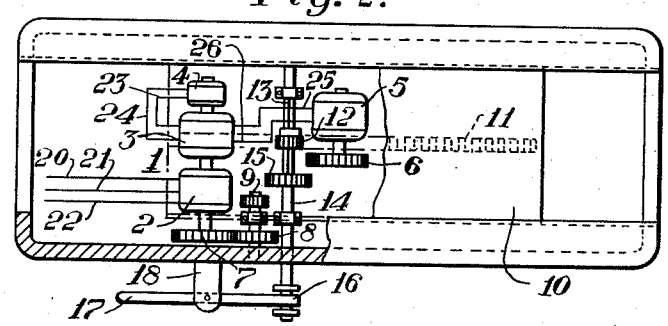
Fig. 2 is a top view partly in section of the milling machine shown in Fig. 1.

In Figs. 1 and 2 numeral 1 denotes a motor-generator set comprising a motor 2 and generator 3 having attached thereto an exciter 4 for the generator. An adjustable speed direct current motor 5 is part of the system and is energized by the generator 3 of the motor-generator set 1. This motor 5 drives a gear 6. A system of gears comprising gears 7, 8 and 9 is driven by the motor 2 of the motor-generator set 1. A platen 10 has a rack 11 secured thereto which rack is longitudinally movable through a gear 12 rigidly mounted on the shaft 13 which shaft is surrounded by and splined to sleeve shaft 14 to permit relative longitudinal movement, only, therebetween. Rigidly mounted on sleeve shaft 14 is a gear 15. Sleeve shaft 14 is slidable by a bifurcated element 16 which is manually movable by handle 17 pivoted on element 18 so that gear 15 may be slid into engagement either with gear 6 or with gear 9 for effecting the driving of the platen 10 through gear 12 either by the motor 5 or by the motor 2 of the motor-generator set 1 and its accompanying gear system 7, 8 and 9 respectively.

The reference numeral 19 denotes a machining tool which in itself forms no part of my invention. Motor 2 is energized by an incoming three-phase line 20, 21, 22. Generator 3 is energized by exciter 4 through conductors 23 and 24. The motor 5 is energized by generator 3 through conductors 25 and 26.

The operation of my device is as follows. Normally, when slow feeding of platen 10 is desired, such platen is driven by motor 5 through gears 6, 15 and 12. When it is desired to move plate 10 at a high speed such as in the case where work is being mounted on the bed or platen 19, gear 15, together with sleeve shaft 14, is slid along shaft 13 by the manually operated handle 17, into engagement with gear 9.

Figure 3:
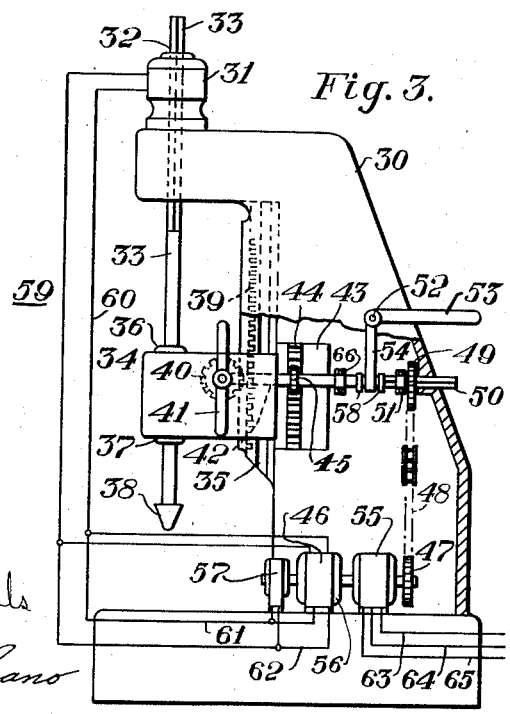
Fig. 3 is a side view of a boring machine showing another embodiment of my invention.

Fig. 3 shows a boring machine having a frame 30 upon which is mounted a motor 31 which drives a sleeve 32. Sleeve 32 drives a shaft 33 which is splined thereto. By virtue of the splined arrangement, relative longitudinal movement is permitted between shaft 33 and motor 31. Support member 34 is mounted so as to be capable of sliding movement on frame 30 through grooves 35. Rigidly attached to shaft 33 are collars 36 and 37 which restrain the slidable support 34 and shaft 33 from relative longitudinal movement. Shaft 33 carries a boring tool 38 which is rigidly secured at the bottom thereof. Rigidly secured to frame 30 is a rack 39. A gear 40 which is manually rotatable by handle 41, and which is pivoted on shaft 42 at right angles thereto, is engageable with the rack. Therefore, when gear 40 engages rack 39, it will be seen that by turning handle 41, slidable support member 34 can be moved up or down. Rigidly secured to the slidable member 34 is a member 43 having thereon a rack 44 which is engageable with a gear 45, which gear is rigidly secured to shaft 42.

A motor-generator set 46 comprising a motor 55, generator 56 and an exciter 57 for said generator drives a sprocket 47 and through chain 48 drives another sprocket 49. Shaft 50 is splined to sprocket 49 and is, therefore, rotatable with it. Sleeve shaft 42 surrounds and is splined to shaft 50, therefore, it can move only longitudinally with respect thereto. A member 51 rigidly secured to frame 30 restrains sprocket 49 from movement to the left. Pivoted on frame 30 at point 52 is a manually operated lever 53 which has a bifurcated arm 54 which arm surrounds shaft 42 and by means of collars 58 which are rigidly secured to sleeve shaft 42, shaft 42 can be moved to the right or to the left. When moved to the right, gear 40 will be brought into engagement with rack 39 and at the same time gear 45 will be disengaged from rack 44. When moved to the left, gear 45 will be brought into engagement with rack 44 and at the same time gear 40 will be disengaged from rack 39. Members 51 and 66 act as stop members for collars 58.

The generator 56 of the motor generator set 46 energizes the driving motor 31 through conductors 59 and 60. Exciter 57 energizes the field of generator 56 through conductors 61 and 62. Motor 55 is energized from a three phase power line 63, 64 and 65.

The operation of the device in Fig. 3 is as follows: The driving motor 31 rotates the boring tool 38. Normally, the boring tool is fed through the gear 40 and rack 39, by manually operating handle 41. For such operation, lever 53 must be moved counter-clockwise, which movement will effect disengagement of gear 45 and rack 44 and at the same time effect engagement of gear 40 and rack 39. When it is desired to raise movable support 34 rapidly, as in the situation where a new work piece is being inserted, lever 53 is turned clockwise, thus shifting sleeve shaft 42 to the left and causing engagement between gear 45 and rack 44 and at the same time, disengagement of gear 40 and rack 39, thus the motor-generator set 46 through its drive will rotate splined shaft 50 and, through gear 45 and rack 44, will move slidable support 34 upwardly.

I am, of course, aware that others, particularly after having had the benefit of the teachings of my invention, may devise other mechanisms embodying my invention, and I, therefore, do not wish to be limited to the specific showings made in the drawings, and the descriptive disclosure hereinbefore made, but wish to be limited only by the scope of the appended claims and such prior art that may be pertinent.

I claim as my invention:

1. In combination, a machine, a motor, a gear system driven by said motor, a motor generator set which energizes said motor, a second gear system which is driven by said motor generator set, and controllable means for completing a driving connection to said machine either through said first gear system or said second gear system.

2. In a milling machine, in combination, a motor, a gear system driven by said motor, a motor-generator set which energizes said motor, a second gear system which is driven by said motor generator set, a platen, controllable means for completing a driving connection to said platen either through said first gear system or through said second gear system.

3. In a milling machine, in combination, a motor, a gear system driven by said motor, a motor-generator set which energizes said motor, a second gear system which is driven by said motor-generator set, a platen, means in driving engagement with said platen including a slidable gear, and a second means for sliding said gear into engagement with either said first gear system or into engagement with said second gear system for selectively securing drive of said platen by either said motor or said motor-generator set, respectively.

4. In a milling machine, in combination, a motor, a gear system driven by said motor, a motor-generator set which energizes said motor, a second gear system which is driven by said motor-generator set, a platen, means in driving engagement with said platen including a gear which is rigidly mounted on a shaft, a sleeve which surrounds and is splined to a portion of said shaft, a second gear which is rigidly secured to said sleeve, means for moving said second gear into driving engagement with either said first gear system or said second gear system for selectively securing drive of said platen by either said motor or said motor generator set, respectively.

5. In a milling machine, in combination, a motor, a gear system driven by said motor, a motor-generator set which energizes said motor, a second gear system which is driven by said motor-generator set, a platen, means in driving engagement with said platen including a gear which is rigidly mounted on a shaft, a sleeve which surrounds and is splined to a portion of said shaft, a second gear which is rigidly secured to said sleeve, manually operated means for moving said second gear into driving engagement with either said first gear system or said second gear system for selectively securing drive of said platen by either said motor or said motor generator set, respectively.

6. A machine tool comprising, in combination, a machine tool element, a platen which carries a workpiece, means for effecting relative motion between said machine tool element and workpiece comprising a motor, a gear system driven by said motor, a motor generator set which energizes said motor, a source of electric supply potential for energizing the generator of said motor generator set, a second gear system which is driven by said motor generator set, and controllable means for selectively completing a driving connection either through said first gear system or through said second gear system for effecting the aforesaid relative motion.

WILHELM CHLADEK.